US012566585B2

(12) United States Patent
Volfson

(10) Patent No.: US 12,566,585 B2
(45) Date of Patent: Mar. 3, 2026

(54) SCOPE WITH TEXT AND SPEECH COMMUNICATION SYSTEM

(71) Applicant: Torrey Pines Logic, Inc., San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 281 days.

(21) Appl. No.: 18/155,495

(22) Filed: Jan. 17, 2023

(65) Prior Publication Data

US 2023/0229388 A1      Jul. 20, 2023

Related U.S. Application Data

(60) Provisional application No. 63/300,495, filed on Jan. 18, 2022.

(51) Int. Cl.
| | |
|---|---|
| *G10L 15/26* | (2006.01) |
| *G06F 3/16* | (2006.01) |
| *G06F 40/126* | (2020.01) |
| *G06F 40/40* | (2020.01) |
| *G10L 13/02* | (2013.01) |
| *G10L 15/22* | (2006.01) |

(52) U.S. Cl.
CPC ............ *G06F 3/167* (2013.01); *G06F 40/126* (2020.01); *G06F 40/40* (2020.01); *G10L 13/02* (2013.01); *G10L 15/22* (2013.01); *G10L 15/26* (2013.01)

(58) Field of Classification Search
CPC .......... G10L 15/26; G06F 3/167; G02B 27/00
See application file for complete search history.

(56) References Cited

U.S. PATENT DOCUMENTS

| | | | | |
|---|---|---|---|---|
| 6,091,546 | A | * | 7/2000 | Spitzer ............... G02B 27/0172 351/158 |
| 7,869,762 | B2 | * | 1/2011 | Lai .......................... H04W 4/02 455/39 |
| 9,940,823 | B2 | * | 4/2018 | Adamo, Jr. .......... G08B 25/001 |
| 10,019,634 | B2 | * | 7/2018 | Vaziri ...................... G06F 3/167 |
| 10,180,565 | B2 | | 1/2019 | Havens et al. |
| 10,337,830 | B2 | * | 7/2019 | McHale .................. F41G 3/165 |
| 10,669,485 | B2 | * | 6/2020 | Koseoglu .............. C10B 57/045 |
| 10,942,006 | B2 | | 3/2021 | VanBecelarere et al. |
| 11,480,781 | B2 | | 10/2022 | Hamilton et al. |
| 12,136,433 | B2 | * | 11/2024 | Geddes ................... G10L 17/02 |
| 2008/0057925 | A1 | * | 3/2008 | Ansari ............. H04M 1/72436 455/414.4 |

(Continued)

FOREIGN PATENT DOCUMENTS

| | | |
|---|---|---|
| AU | 2017270586 | 5/2019 |

*Primary Examiner* — Daniel Abebe
(74) *Attorney, Agent, or Firm* — Fish & Richardson P.C.

(57) ABSTRACT

An apparatus can include an optical device comprising an internal display, a communications system coupled to the optical device, the communications system to receive a wireless signal comprising data representing a textual signal, and a hardware processor to convert the data representing the textual signal into a format for displaying on the digital display. The apparatus can include a text and speech processor for converting signals representing audible speech to visual text and primitive graphics for display on the internal display. The text and speech processor can also convert text to speech for audio output.

16 Claims, 7 Drawing Sheets

(56) References Cited

U.S. PATENT DOCUMENTS

| | | | |
|---|---|---|---|
| 2013/0169820 A1 | 7/2013 | Stewart | |
| 2015/0379896 A1* | 12/2015 | Yang | G09B 21/00 |
| | | | 434/112 |
| 2017/0243582 A1* | 8/2017 | Menezes | G10L 13/0335 |
| 2017/0330042 A1* | 11/2017 | Vaziri | G02B 26/0875 |
| 2018/0075659 A1* | 3/2018 | Browy | G02B 27/0172 |
| 2019/0206132 A1* | 7/2019 | Zielkowski | G06F 3/011 |
| 2020/0012127 A1* | 1/2020 | Howell | G02C 11/10 |
| 2021/0407203 A1* | 12/2021 | Canberk | G02B 27/0093 |
| 2023/0069328 A1* | 3/2023 | Jun | H04L 51/07 |

* cited by examiner

1

SCOPE WITH TEXT AND SPEECH COMMUNICATION SYSTEM

CROSS REFERENCE TO RELATED APPLICATION

Pursuant to 35 U.S.C. § 119(e), this disclosure claims the benefit of Provisional Patent Application Ser. No. 63/300,495, filed on Jan. 18, 2022, titled "Scope with Text and Speech Communications System," the entire contents of which are hereby incorporated by reference herein.

BACKGROUND

A spotting scope is a compact high-power telescope optimized for detailed observation of distant objects. They are used as portable optical enhancement devices for various outdoor activities such as birdwatching, skygazing and other naturalist activities, for hunting and target shooting to verify a marksman's shot placements, for tactical ranging and surveillance, and for any other application that requires high magnification.

SUMMARY

Aspects of the embodiments are directed to an apparatus that includes an optical device comprising a digital display; a communications system coupled to the optical device, the communications system to receive a wireless signal comprising data representing a textual signal; and a hardware processor to convert the data representing the textual signal into a format for displaying on the digital display.

In some embodiments, the digital display is an internal display of the optical device.

In some embodiments, the optical device includes an optical path and wherein the display displays information in the optical path.

In some embodiments, the user interface includes an audio output to audibly output the audible speech.

Some embodiments include a ping button, the ping button to cause the communications system to wirelessly send an instruction to another communications system to output an audible ping.

Some embodiments include a microphone to receive audible speech and to convert audible speech into electrical signals; wherein the communication system is to send the electrical signals to another communications system.

Some embodiments include a text and speech processor to convert signals representing audible speech into signals representing visual text and to convert signals representing visual text into signals representing audible speech.

Aspects of the embodiments are directed to a method that includes receiving, from a host device, a wireless signal at a communications system coupled to an optical device, the wireless signal including a data payload; determining textual information from the data payload; and displaying the textual information on a display of the optical device.

Some embodiments include converting the text to audible speech by a text and speech processor at the optical device; and outputting the audible speech to an audio output of the optical device.

Some embodiments can include receiving audible speech into a microphone of the optical device; converting the audible speech into digital data; and transmitting the digital data of the audible speech by the communications system to the host device.

Some embodiments can include receiving audible speech into a microphone of the optical device; converting the audible speech into text by a hardware processor executing speech-to-text conversion instructions; encoding the text as digital data; and transmitting the digital data with the text to the host device by the communications system.

Some embodiments can include receiving an indication of an acknowledgement of the textual information from a tactile user interface, the indication being non-audible; and transmitting a wireless signal of the acknowledgement to the host device.

In some embodiments, the display is an internal display of the optical device.

Aspects of the embodiments are directed to an apparatus that includes an optical device; an audio input/output device to receive audible voice inputs; a text and speech processing system to convert the audible voice inputs into textual data; and a communications system coupled to the optical device, the communications system to transmit a wireless signal comprising textual data to another device.

In some embodiments, the communications system is to receive a wireless signal including textual data from another device; the text and speech processing system is to convert the textual data into audible speech; and the audio input/output device is to output the audible speech.

In some embodiments, the apparatus includes a digital display for displaying information; the communications system is to receive a wireless signal including voice data from another device; the text and speech processing system is to convert the voice data into textual message; and the display is to display the textual message.

In some embodiments, the communications system is to receive a wireless signal including voice data from another device, the voice data including data representing audible speech; and the audio input/output is to output the audible speech.

In some embodiments, the communications system is to receive a wireless signal including one or more tones from another device. The apparatus can include a processor to decode the one or more tones into a natural language message, and a display to display the natural language message; and the text and speech processing system to convert the natural language message into audible speech from outputting from the audio input/output device.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DETAILED DESCRIPTION

Optical devices can include internal displays. Internal displays can overlay or display any information generally desirable for viewing by an operator within the optical path of the optical device. Examples include compass or directional information, range information, zero-ing information, target acquisition information, target identification information, or other information. Displays can provide information located at all or any portion of the apparent optical device view, including a top side or a bottom side. In embodiments, imagery, text, or other information can overlay any viewable area and/or can augment the optical image with virtualized imagery or information.

Closed captioning can dynamically capture the voice or received speech and convert the voice or received speech into text (in any language). The text can be streamed onto a screen.

Figure 4A:
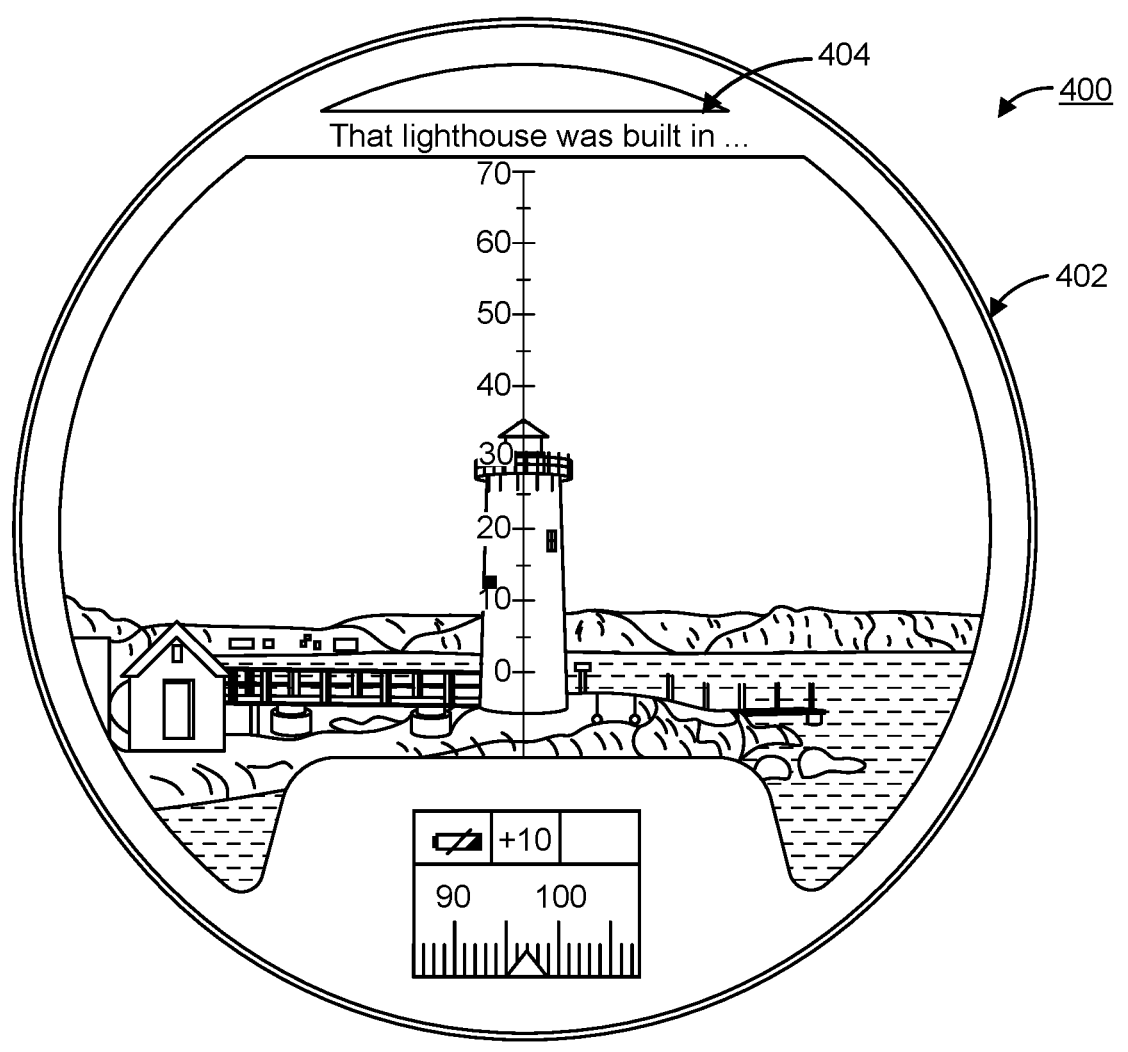
FIGS. 4A-C are schematic diagrams illustrating example streaming text on an internal display in accordance with embodiments of the present disclosure.
Figure 4B:
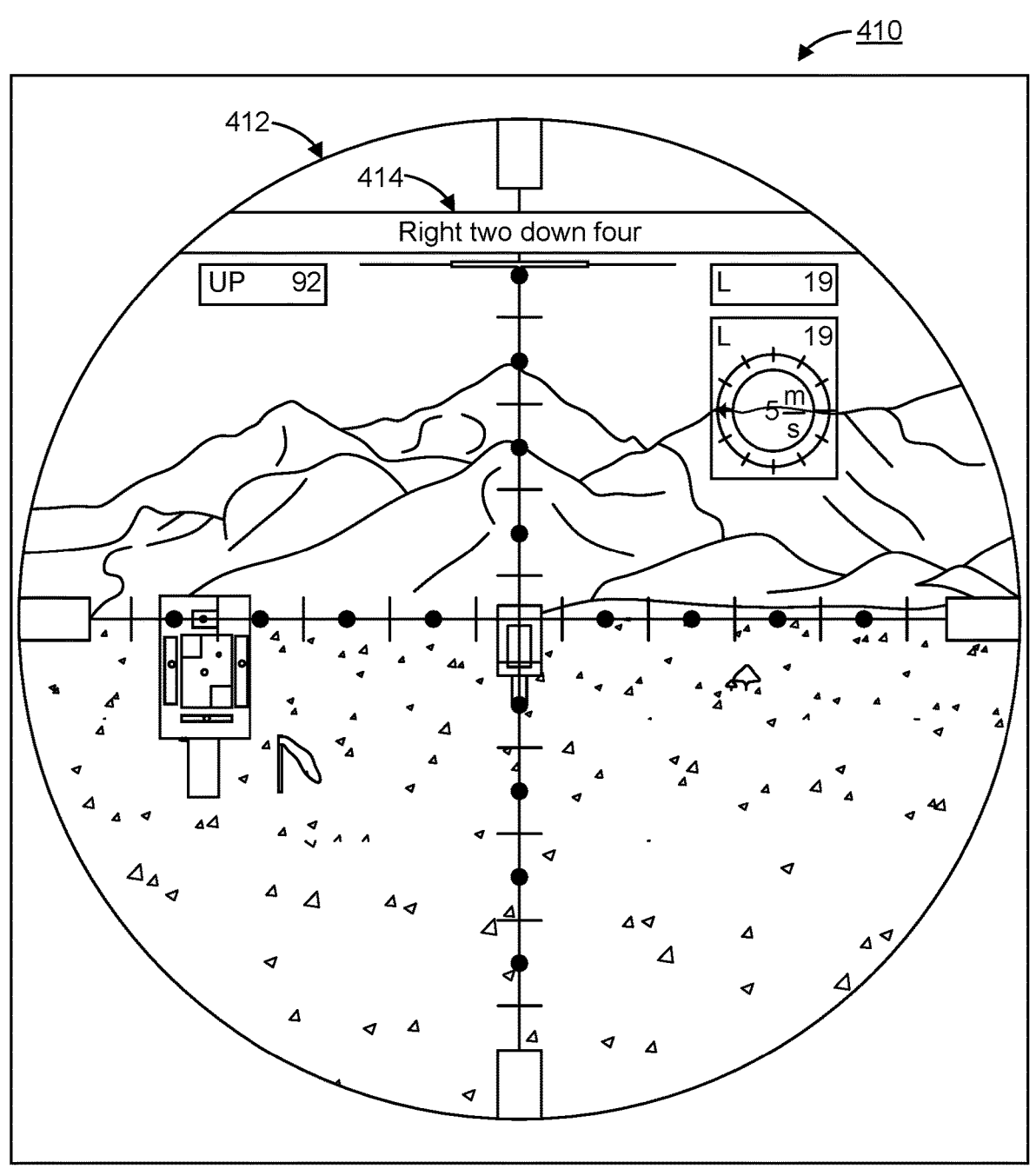
Figure 4C:
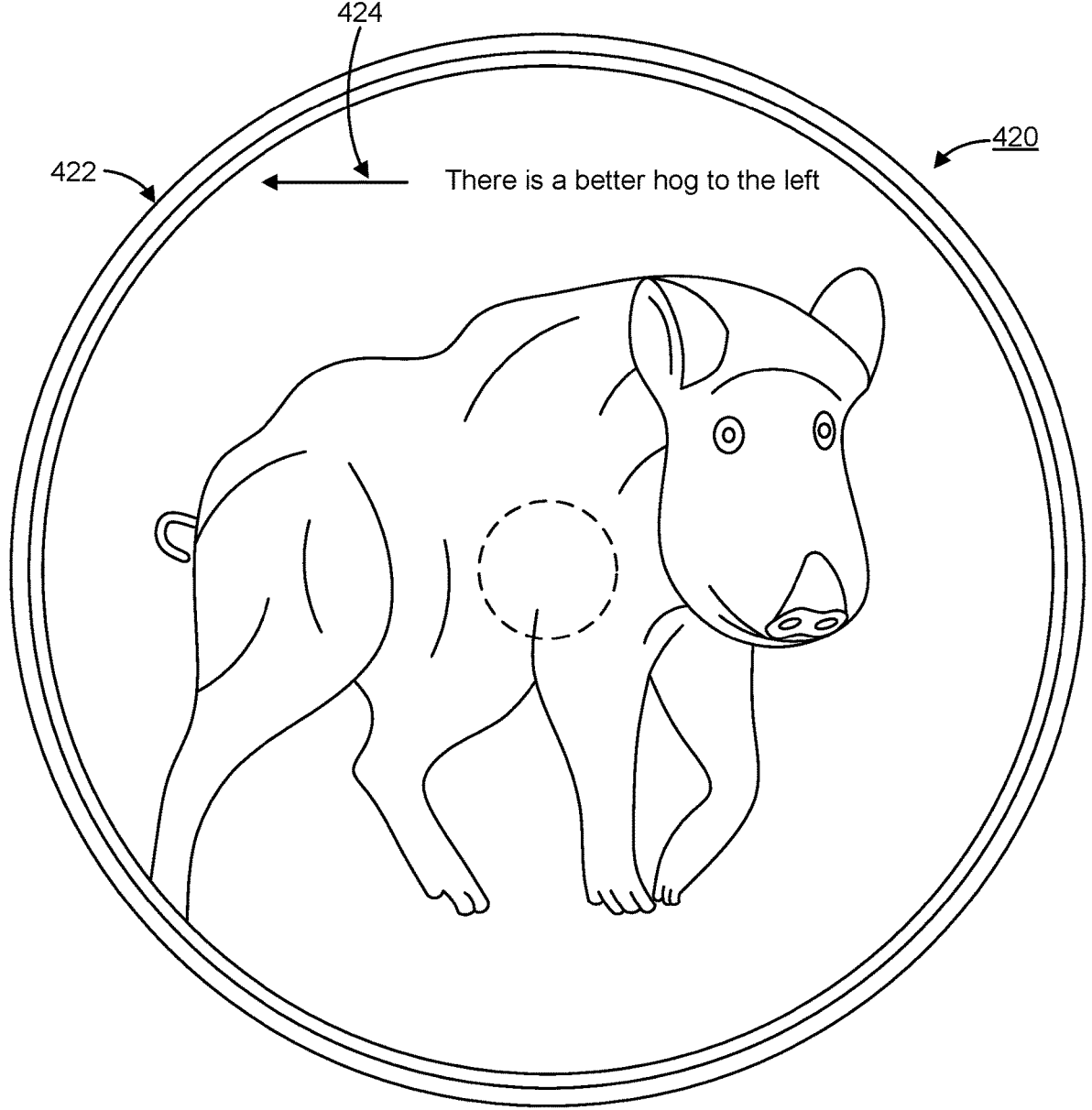

This disclosure describes a standalone device or device integrated with an optical device that facilitates voice or speech to text and vice versa, communicating text to other devices, and optical devices that include internal displays that can stream received text. Whether information is transmitted to the optical device via wired or wireless communications protocols, the information is displayed on the displayed image or around it, as shown in FIGS. 4A-B. Voice commands can also be converted to and displayed as graphics primitives. For example, if voice command says "LEFT," a left arrow can appear on the screen (as seen in FIG. 4C). The usefulness of the graphic primitives would be in directing one viewer with an optical device to see something that another viewer is seeing, which can aid in accurate target acquisition and identification, as well as in ranging. For example, a spotter with a laser rangefinder can indicate target range and identification to another operator using an optical device, while that operator can continue viewing the scene through the optical device and without having to go "off scope."

Figure 1A:
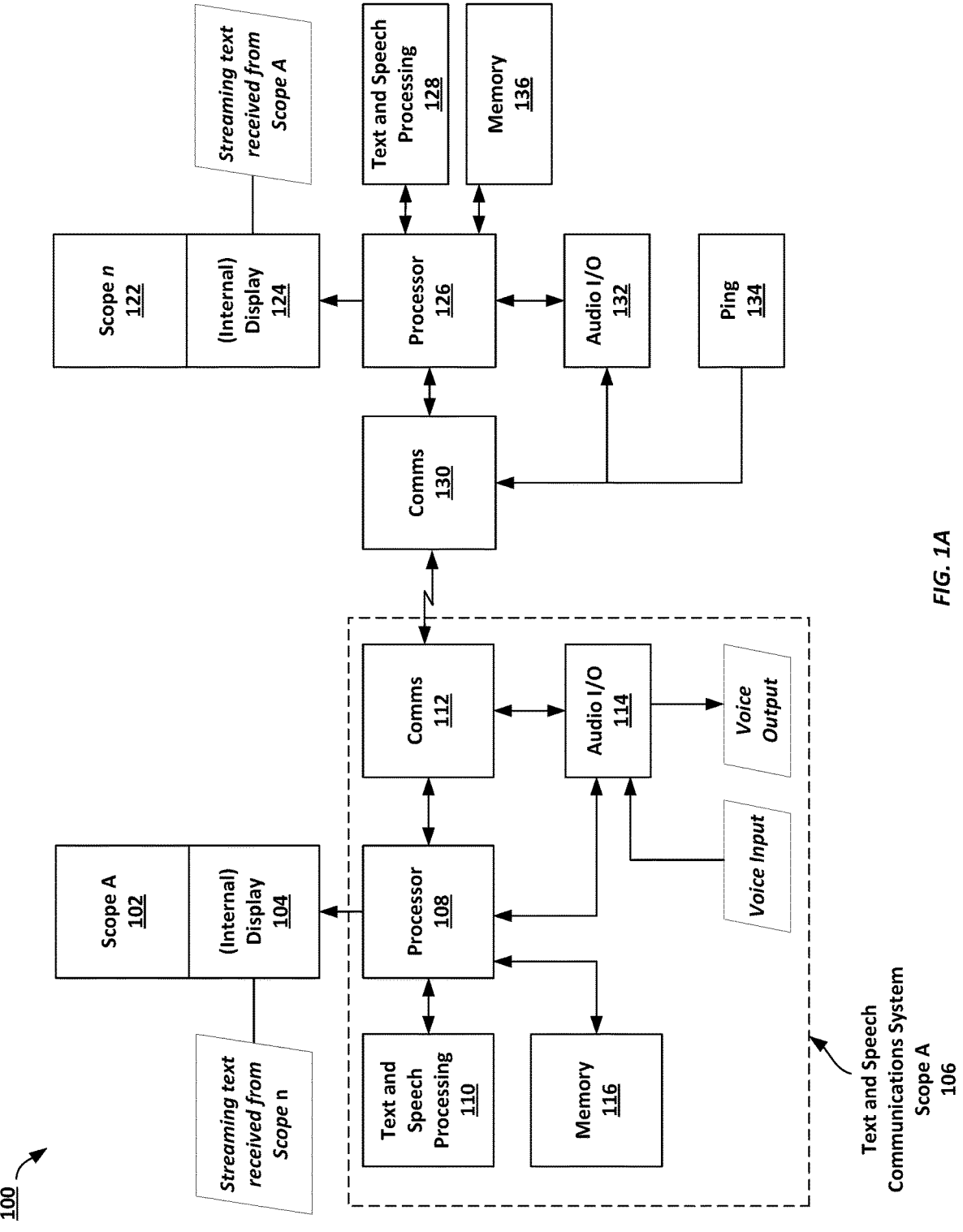
FIG. 1A is a schematic diagram of an example scope with a text and speech processing system in accordance with embodiments of the present disclosure.

FIG. 1A is a schematic diagram of an example system 100 that includes a primary device 101a with a text and speech processing system in communication with one or more secondary devices 101b, in accordance with embodiments of the present disclosure. FIG. 1A illustrates a first (or primary) scope assembly 101a, which includes a scope 102, referred to as Scope A 102. Scope A 102 can be a spotting scope, rifle scope, binocular, or other type of optical device that can view objects at a distance using optical and/or digital magnification.

Primary scope assembly 101a includes a text and speech communications system 106. Text and speech communications system 106 can be a standalone device (e.g., that connects mechanically, electrically, or both to Scope A 102) or can be integrated into Scope A 102, or some combination. Text and speech communications system 106 includes a hardware processor 108 and memory 116. Memory 116 can include non-transitory, computer-readable storage media storing instructions that, when executed, causes hardware processor 108 to perform operations. Such instructions can include text and speech processing 110. Text and speech processing 110 can include receiving audible speech and converting the audible speech into readable text and/or graphics primitives in a format compatible for display on an internal display 104 of Scope A 102 and other scopes, such as Scope n 122. In some embodiments, the text and speech processing 110 includes speech recognition or voice recognition capabilities. The text and speech processing 110 can make use of machine learning algorithms and training. Text and speech processing 110 can also include foreign language translation capabilities, to translate speech from one language into text in another language (e.g., based on a user profile, operator selection, etc.). In addition, the text and speech processing 110 can convert audible speech into data representing text and/or graphics primitives in a format compatible with transmission using a wired or wireless communications protocol. In embodiments, the data formatting for communicating text and/or graphics primitives can be done using elements of communications protocol stack that is part of communications logic 112 (described later in connection with FIG. 1B). Text and speech processing 110 can include open or closed captioning technology as part of the streaming text capabilities of the text and speech communications system 112.

Text and speech communications system 106 includes a communications system 112. The communications system 112 can include hardware and software elements for securely communicating wirelessly to other communications systems using any number of communications protocols, including cellular, Bluetooth, Wi-Fi, Satellite, SMS, Voice-over-IP, SIMPLE, combat radio, trunk broadband, or other types of communications protocols. The communications system 112 (or the text and speech communications system 106, generally) can also include open or closed captioning technology to convert speech to text and to stream text from the primary scope assembly 101a to other devices. Communications system 112 can communicate with other devices through a network 180. Network 180 can be a wide area network or a local area network. Network 180 can include cellular networks, satellite communications networks, Internet, Wi-Fi, etc. Other devices can include other text and communications systems coupled to or integrated with other optical devices or other communications devices, such as smartphones, smart watches, or other types of personal communication devices.

Text and speech communications system 106 also includes an audio input/output (I/O) 114. Audio I/O 114 can include a microphone or other voice input device. The microphone can be a stand-alone microphone or could be part of a headset or radio device. The microphone can be wired or wireless. The microphone can detect audible speech by an operator of Scope A 102 or text and speech communications system 106. For example, the operator can audibly say where an observed object is. The microphone can pick up that audible sound. The text and speech processing 114 can convert the audible speech into text.

The communications system 112 can send the text to other devices (in some cases as streaming text) using a communications protocol, such as SMS, closed-captioning, or other communications protocol. In embodiments, the text and speech communications system 106 can send data representing audible speech to another device using the communications system 112. For example, communications system 112 can packetize the audible speech and transmit the audible speech as data (e.g., voice over IP) to another device using a communications protocol. The other device can then audibly output the speech to the operator of the other device and/or convert the received speech data into text and/or graphics primitives for display on a display associated with the other device. Put differently, the text and speech communications system 106 can convert speech to text and can send data representing text to one or more other devices (in a streaming manner, in a burst, or some combination) using a communications protocol. The text and speech communications system 106 can also digitize and packetize audible speech and send data representing audible speech to one or more other devices (in a streaming manner, in a burst, or some combination) using a communications protocol.

The audio I/O 114 can also output audible speech or other sounds, such as by a speaker, headset, headphones, and can be wired or wireless, such as a Bluetooth headset.

Scope A 102 is shown to include a display 104. Display 104 can be an internal display 104, which is internal to the Scope A. For example, an operator using Scope A 102 can view information presented on display through an ocular assembly. Display 104 can also be an external display, such as a display screen that also provides digital view-finding capabilities. So, an operator can view a scene while also viewing messages or graphics, without having to shift viewing positions. In some embodiments, the text and speech communications system 106 can include a display 118 for displaying various pieces of information, including text and graphics, view-finding capabilities, menu options, battery or power levels, secondary scopes that are in communication with primary scope assembly 101a, etc. Noteworthy is that display 104 can also display one or more of these pieces of information to the operator.

The text and speech communications system 106 can also include a display 118. Display 118 can display various information, including text and graphics, menu information, power status, connection status, etc. The display 118 can provide a visual I/O for controlling the text and speech communications system 106. Display 118 can be a touch screen display so an operator can interact with options displayed on the display 118 for various purposes.

FIG. 1A also illustrates an example secondary scope assembly 101b that can receive and display streaming text. Secondary scope assembly 101b can include a scope, such as Scope n 122, which can be a rifle scope, binocular, spotter scope, telescope, thermal or IR scope, etc. Secondary scope assembly 101b can be one of any number of optical device assemblies that that are in communication with the primary scope assembly 101a. Secondary scope assembly 101b includes a text and speech communications system 126. Text and speech communications system 126 can be the same or similar to text and speech communications system 106. In FIG. 1A, text and speech communications system 126 is coupled to or integrated with Scope n 122 and can receive data representing text and/or speech from the text and speech communications system 106 associated with primary scope assembly 101a and Scope A 102.

Text and speech communications system 126 includes a hardware processor 128 and memory 136. Memory 136 can include non-transitory, computer readable storage media, storing instructions that, when executed, cause the hardware processor 128 to perform operations, such as operations for text and speech processing 130. In some embodiments, secondary scope assembly 101b can include a text and speech communications system 126 that can receive a data packet, decode the data packet, format the payload for display on a screen, and cause the information to be displayed as text and graphics on a display 124 of the Scope n. In some embodiments, the secondary scope assembly 101b can include a text and speech communications system 126 with more processing power, such as processor 128 that can perform text and speech processing 130, and other features as described below.

Text and speech communications system 126 includes a communications system 132 that can receive information from text and speech communications system 106 associated with Scope A, including text and visual information, or from other devices. The communications system 132 can communicate over a wide area network, local area network, Bluetooth connection, Wi-Fi, cellular network, satellite network, etc. The communications system 132 can receive information over network 180, for example, and send received information to a processor 128 for displaying on a display 124 (e.g., an internal display 124) of Scope n. The display 124 be an internal display or external display. Display 124 can stream the text and graphics so the text and graphics visually appears to an operator looking through the ocular assembly of Scope n or on a digital viewfinder of Scope n for scopes with external display devices, as shown by way of example in FIGS. 4A-4C.

The communications system 132 can use a wireless communications protocol to receive packetized data from another communications device. The communications system 132 can include software modules to interpret the data, and format the received data into a format that is suitable for human consumption, such as audible sound, viewable text or graphics, etc. The communications system 132 can also convert the packetized data into a digital data format that can be processed by text and speech processing 130, which can convert digital data received from another device into one or both of audible speech and readable text.

In embodiments, the text and speech communications system 126 of the secondary scope assembly 101a can include a processor 128 that is capable of executing text and speech processing 130. Text and speech processing 130 can receive text from the communications system 132 and convert the text into audible speech. The audible speech can be heard by the operator of secondary scope assembly 101b through a headset or other audio I/O 134. In embodiments, the text and speech processing 130 can convert audible speech or data representing audible speech into text. That way, voice data can be received at the text and speech communications system 126, and the text to speech processing 130 can convert voice data into textual data for displaying on display 124. Text and speech processing 130 can also be used to convert audible text from an operator of secondary scope assembly 101b into text for transmission to another device by communications system 132. Text data tends to be easier to transmit than voice data, so text data can be transmitted using lower power and lower bandwidth communications. However, it is understood that communications system 132 is capable of receiving and transmitting voice data, text data, and graphical data.

In some embodiments, the operator of secondary scope assembly 101b may want to reply to a message from operator of primary scope assembly 101a with a verification or acknowledgement (or negative acknowledgment) of the streaming text. The operator of secondary scope assembly 101b can use a headset or other audio I/O 134 to audibly communicate. The audible message can be sent directly to primary scope assembly 101a by communications system 132. Or the audible message can be converted into text using text and speech processing 130, and a textual message can be sent to primary scope assembly 101a by communications system 132. The communications system 132 can also convert information into data suitable for transmission, based on the associated communications protocol. For example, an operator using secondary scope assembly 101b can speak into an audio I/O 134, such as a microphone or headset, and the communications system 132 can transmit that audible speech to another device. In embodiments, the operator's audible speech can be converted into text by text and speech processing 130, and the communications system 132 can send data representing text to another device using a communications protocol.

Communications system 132 can also tag messages that are to be sent by secondary scope assembly 101*b* with identification information. The primary scope assembly 101*a* can identify the sender of messages so that the operator of the primary scope assembly 101*a* can ensure acknowledgements (or negative acknowledgements) from each secondary scope assembly 101*b*.

The text and speech communications system 126 can also include a display 138. Display 138 can display various information, including text and graphics, menu information, power status, connection status, etc. The display 138 can provide a visual I/O for controlling the text and speech communications system 126. Display 138 can be a touch screen display so an operator can interact with options displayed on the display 138 for various purposes. Included among the various purposes includes the ability to set a language for the text and speech processing 130. Two operators may speak different languages. Thus, an operator of primary scope assembly 101*a* can send information in one language and receive information in another. The operator can set the language on their end to be whatever they know; and the operator of a secondary scope assembly 101*b* can use a different language. As an example, operator of primary scope assembly 101*a* (operator 1) can set their system to English. Operator of secondary scope assembly 101*b* (operator 2) can set their system to Spanish. Operator 1 can speak English into their audio I/O, and English language can be converted into text or send as voice data. Operator 2 having set their system to Spanish, can receive the English language data, and the text and speech processing 130 can convert the English to Spanish prior to displaying text or audibly outputting voice data. Likewise, Spanish language messages sent by operator 2 can be converted into English by text and speech processing 110. A machine-based translator, an AI system, or other fast translation algorithm can be used for translations, depending on the implementation. The language can be set via the display menus.

The primary scope assembly 101*a* can receive text or audible information from secondary scope assembly 101*b*. The text can be displayed directly onto a display 104 of Scope A 102 (e.g., as streaming text). Display 104 of Scope A 102 can be an internal display or an external display. The text to speech processing 110 can also convert the text into audible speech, which can be output to the operator of Scope A 102 through a headset or a speaker system or other audio I/O 114. If a ping is received, the ping tones can be audibly output to the headset or speaker or other audio I/O 114 Or the ping can be interpreted by processor 108 or text and speech processing 110 as readable text or audible speech, and the corresponding interpreted information can be visually displayed on an internal display of Scope A 102 or audibly output by headset/speaker/other audio I/O 114.

Notably, the display 104 of Scope A 102 can display text or other visual information received from several other scopes. The text displayed on the display of Scope A 102 can uniquely identify the source of each textual or visual communication. Communications system of each scope can encode unique identifiers that are packetized with the transmitted information. This unique identifier can be used to identify the source of each message.

In some instances, the operator of Scope n may be required to remain silent. To accommodate silent situations, the text and speech communications system 126 can include a ping button 140. A ping button can be pressed to send tones through communication system to the operator of Scope A 102. Tones can be interpreted by the operator of Scope A 102. In some cases, tones can be interpreted by a processor at Scope A and converted to text or speech by a text and speech processing 110. Ping button 140, when actuated, can cause an acknowledgement ping to be sent to the primary scope assembly 101*a* (and/or to other secondary scope assemblies). The ping button 140 can be used to send an acknowledgement of an instruction without the operator having to make any noise. The ping button 140 can be situated, for example, near a location where the operator's hands would be, such as on the housing of the scope or near the trigger guard of a rifle. The ping button 140 can also be connected to a headset or other audio I/O 134. The operator can actuate the ping button 140, which can send a signal to the communications system 132 or to the processor 128 (e.g., through audio I/O 134). In embodiments, a ping can be transmitted as an audio signal or digital signal representing an audible ping (or multiple pings). In embodiments, a ping can be converted into text preselected by the operator to represent an acknowledgement, such as "OK" or "confirmed" or the like. Combinations of pings can also be used to represent different things. For example, double ping can represent negative acknowledgement. Pings can also be used for Morse code or other encrypted coding for communications. Pings representing Morse code can be packetized and transmitted over the communications protocol, and decrypted at the recipient side. Or the text and speech processing 130 can convert pings, including Morse code, from inputs to ping button 140 into text for transmission to other devices through communications system 132. Strong encryption can be used to ensure that encoded signals are protected from interception and decoding by a third party.

Also noteworthy is that a primary scope assembly 101*a* can act as a secondary scope assembly, similar to secondary scope assembly 101*b*. Also, secondary scope assembly 101*b* can act as a primary scope assembly. Secondary scope assembly 101*b*, for example, can transmit information to another scope other than the primary scope assembly 101*a*.

Figure 1B:
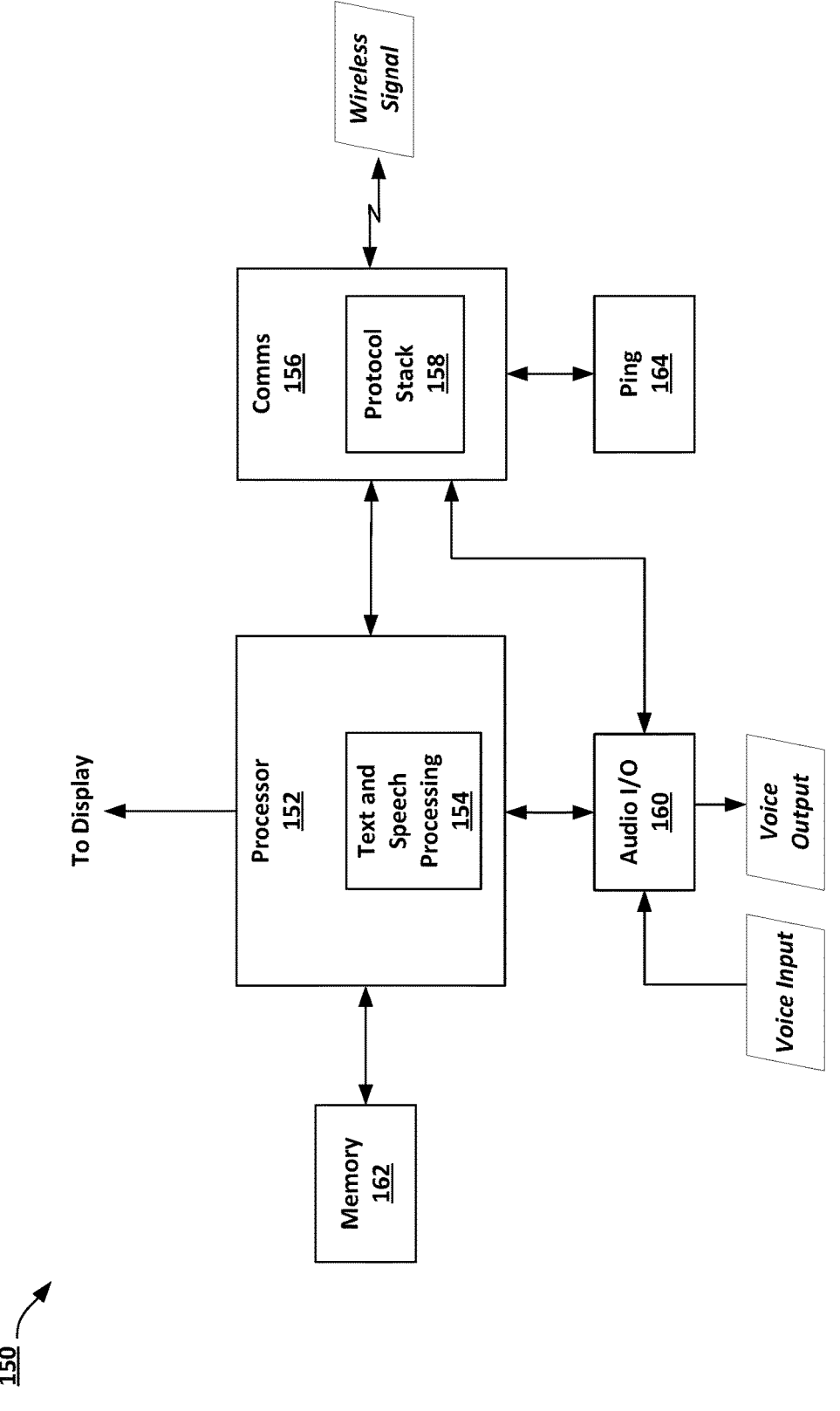
FIG. 1B is a schematic diagram of an example text and speech communication system in accordance with embodiments of the present disclosure.

FIG. 1B is a schematic diagram of an example text and speech communication system 150 in accordance with embodiments of the present disclosure. As mentioned above, the text and speech communications system 150 can be integrated with a scope or can be a standalone device. FIG. 1B illustrates components that can be part of the text and speech communications system 150, as well as the text and speech communication systems already discussed in FIG. 1A.

The text and speech communications system 150 includes an audio I/O 164, which can include a speech input device, such as a microphone. The microphone can receive audible speech and convert the audible speech to electrical signals. The electrical signals representing audible speech can be directed to the processor 158 for processing by text and speech processing 160. In embodiments, the microphone can be part of a headset or can be a standalone microphone. The audio I/O 164 can also include audio output, such as a speaker, earphones, headset, earbuds, etc. The audio I/O 164 can convert electrical signals and output audible signals.

The text and speech communications system 150 includes a hardware processor 158 and a memory 166. Memory 166 can include non-transitory, computer-readable storage media storing instructions that, when executed, causes hardware processor 158 to perform operations. Such instructions can include text and speech processing 160. Text and speech processing 160 can convert electrical signals representing audible speech into data representing text, and can convert data representing visual text into electrical signals representing audible speech. In some embodiments, the text and speech communication system 150 can convert text to speech and speech to text. In some embodiments, the text and speech communication system 150 can convert ping tones to one or both of text or speech. In addition, text and speech processing 160 can be consider language conversion, and can convert speech and text from one language to another.

Text and speech communications system 150 includes a communication system 162 that can transmit data to another device. For example, the communications system 162 can transmit data packets that include voice data and/or text data. The communications system 132 can use a communications protocol to transmit text, including cellular communications, SMS, packet data protocols, voice over IP, closed-captioning technology, or other communications protocols, as mentioned above or known to those of skill in the art. The communication system can include a protocol stack 172. The protocol stack 172 can include multiple layers of technology, physical layer, network layer, transport layer, session control, and application layer. The protocol stack 172 can perform operations, such as the creation of packets from payload data, encoding/decoding, encryption/decryption, error handling, modulation/demodulation, etc. The protocol stack 172 can create data packets that include signals representing text information and/or voice information for transmission across a wireless link. In some embodiments, communication system 162 can use wired communications links. In some embodiments, the communications system 162 can output text directly to a display.

In some embodiments, the text and speech communication system 150 can include a ping button 170 that can create a ping tone for acknowledging or negatively acknowledging text instructions. The ping tones can be converted into data representing audible pings and sent that way; or ping tones can be converted into text or speech by processor 158 (e.g., operating text and speech processing 160). Likewise, ping tones can be received and audibly output to a headset or speaker. The ping tones can be translated into text or speech for output by a text and speeching processing on the receiver-side. As an example, ping button 170 can be used to send Morse code signals. Text and speech processing 160 can convert Morse code into text or speech, and the text or speech can be sent wirelessly to another device by communications system 162. Or, the Morse code can remain as dits and dahs in the data packets, and the dits and dahs received on the receiving device can decode the Morse code message.

Generally, the text and speech processing 160 performed by a device can include one or both of text-to-speech and speech-to-text. This way, multiple communication modes are supported: 1) Speech is transmitted, and speech is received by a receiving device and converted into text for display (audible speech can be output, too); or 2) Speech is converted to text and text is transmitted; the received text is displayed, and the received text is optionally converted to audible speech and output through a headset. Other combinations are also possible and are within the scope of this disclosure.

In some embodiments, the text and speech communications system 150 includes a display 168. The display 168 can be a touch screen display, so that a user can manually interact with menu items, options, control, connection, etc. The display 168 can also display text and graphics. The text and speech communications system 150 can include a power supply 174. Power supply 174 can include a battery, such as a rechargeable battery, Lithium-Ion battery, or other type of battery.

The text and speech processing 160 can perform general text-to-speech processing and speech-to-text processing. Text and speech processing 160 can be a trained algorithm that can use as input text and output audible speech; and can use as input audible speech and output readable text and primitive graphics. The text and speech processing 160 can, for example, replace certain words with graphical icons, based on user choices and selections. For example, the word "left" can be replaced by a left arrow; an acknowledgement message or term can be replaced with a checkmark. The use of primitive graphics (or graphics in general) is implementation-specific.

The text and speech processing 160 can make use of machine learning algorithms or other artificial intelligence models to accurately convert between text and speech. In addition, in some embodiments, text and speech processing 160 can translate between languages. This way, a tourist from a foreign country who many not have mastery of one language can still enjoy a viewing experience in their own language. Translations can also be performed by the hardware processor 158 implementing specific translation programming. That is, after incoming speech is converted into text by the text and speech processing 160, the processor 158 can translate the text into another language for display.

The text and speech communication system 150 also includes an interface to connect to a display of an optical device. For example, an optical device with an internal display can include an input to the internal display, whether wired or wireless. The text and speech communications system 150 can include an interface that allows for text to be sent to the internal display for displaying. To that end, the processor 158 can perform a handshake routine with the internal display of the optical device, so that the processor 158 can send text data for display on the internal display of the optical device.

Figure 2:
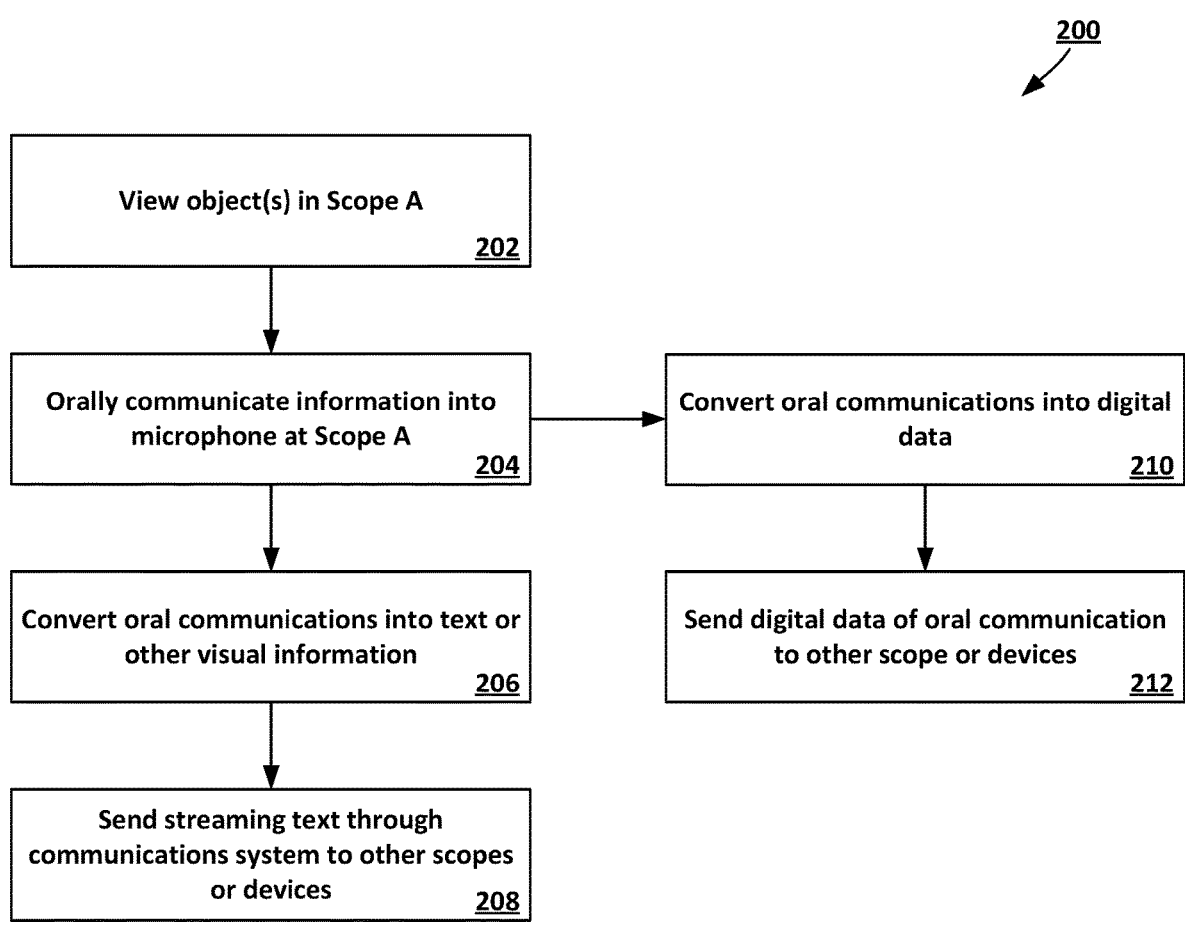
FIG. 2 is a process flow diagram for communicating streaming text from a first scope to another scope in accordance with embodiments of the present disclosure.
Figure 2:
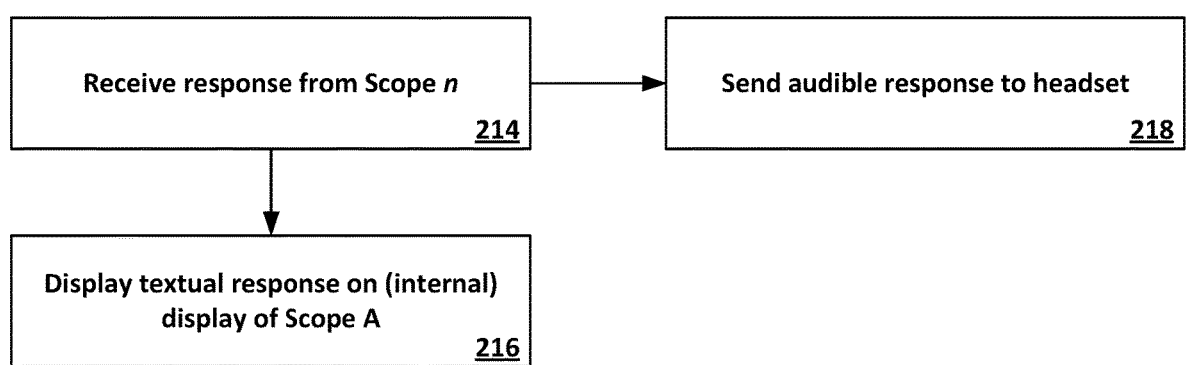

FIG. 2 is a process flow diagram 200 for communicating information from a primary scope assembly to a secondary scope assembly in accordance with embodiments of the present disclosure. As an example, Operator A of Scope A of primary scope assembly can view an object through the scope. 202. Operator A can audibly describe the relative position, distance, identification information, or other information about the object. A microphone can pick up the audible speech. (204). A text and speech processor can convert the audible speech into text. (206). The communications system can send the text to other scopes. (208). The text can be sent as a stream so that the other scopes receive a streaming banner or other form of streaming text, similar to closed-captioning.

In embodiments, the primary scope assembly can convert the audible speech into data, (210), and the primary scope assembly can transmit the voice data instead of textual data. (212). It is understood that the text and speech communications system of the secondary scope assembly receiving the voice data would then convert the voice data into text for displaying (and can output audible speech as well).

In some embodiments, the primary scope assembly can receive a response from secondary scope assembly from Operator n using Scope n. 214. If the response is textual, the primary scope assembly can display the textual response on a display and can optionally convert the text to speech for audible output to a headset or speaker. If the response is audible speech, the primary scope assembly can output audible speech and can optionally convert the audible speech to text. Primary scope assembly can operate in a way selected by the operator, so if the operator prefers text displayed on a display, then Operator A can so choose that option; if Operator A prefers audio outputs, then Operator A can choose audio outputs. Operator A can also choose both or neither, depending on implementation. Primary scope assembly can send audible information to a headset/speaker. 218. Primary scope assembly can also send text to a display. Primary scope assembly can use text and speech processing to convert received information into desired format for consumption. Primary scope assembly can include other processors to perform similar functions, including interpreting ping tones into visual or audible information and translation programs.

Figure 3:
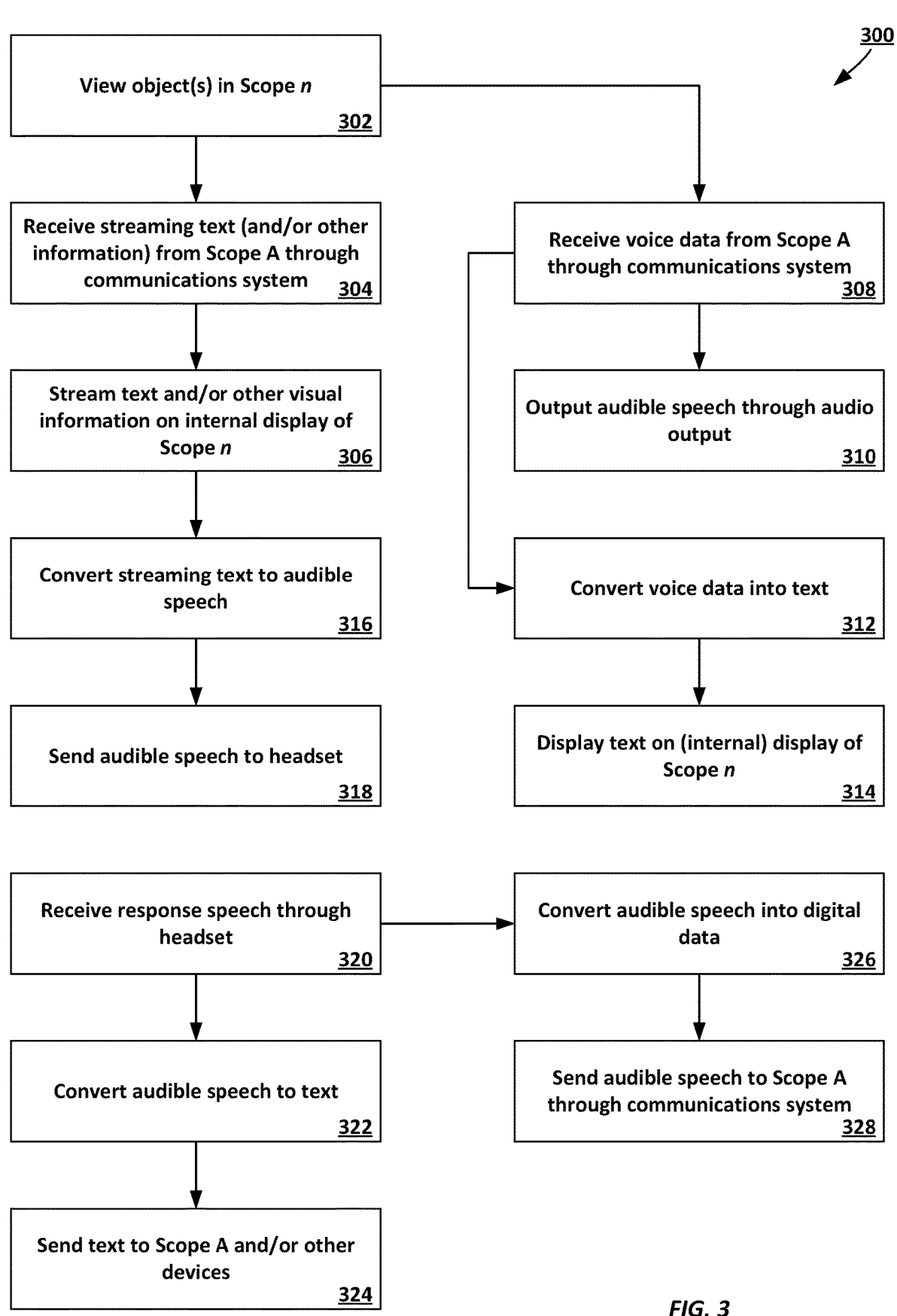
FIG. 3 is a process flow diagram for streaming received text onto an internal display of a scope in accordance with embodiments of the present disclosure.

FIG. 3 is a process flow diagram for streaming received text onto an internal display of a scope in accordance with embodiments of the present disclosure. Secondary scope assembly can be operated by Operator n using Scope n to view a scene. 302. The communications system can receive text or other visual information from Scope A. 304. The text information can be displayed on an internal display of Scope n (e.g., as streaming text). 306. Other information can also be displayed. For example, if the information is to move left, the internal display can show a left arrow with other information. In addition, as an option, the streaming text can be converted into audible speech for Operator n by text and speech processing at secondary scope assembly. 316. The audible speech can be output by a headset worn by Operator n or other operators nearby. 318.

In embodiments, Operator n can receive voice data from Operator A through the communications system. 308. The audible speech from the voice data can be output to a headset of other audio I/O. 310. In embodiments, the voice data can be converted to visual text by text and speech processing at secondary scope assembly. 312. The visual text (and other graphics) can be displayed on a display at secondary scope assembly, such as an internal display. 314.

In some embodiments, Operator n may want to reply to Operator A. Operator n can respond audibly directly to Operator A. 320. The secondary scope assembly can include a text and speech processing that can convert audible speech into text, 322, which is then communicated to the primary scope assembly as textual data. 324. The secondary scope assembly can include a ping feature, and the communication system can transmit ping tones to Scope A. In embodiments, secondary scope assembly can convert audible speech to voice data. 326. Scope n can then send the voice data to the primary scope assembly. 328. The secondary scope assembly can also convert ping tones into text or speech data for transmission to the primary scope assembly.

Scope A can visually or audibly output replies from Scope n. For example, Scope A can convert text to speech, speech to text, or ping tones to speech or text. Scope A can include an internal or external display for displaying received information visually to Operator A. Operator A can also audibly receive information from Operator n through a headset of speaker.

FIGS. 4A-4C are schematic diagrams illustrating example streaming text on an internal display in accordance with embodiments of the present disclosure. FIG. 4A is a schematic diagram 400 of an optical device 402 viewing a lighthouse. Optical device 402 can be the same or similar to secondary scope assembly 101b of FIG. 1A. The optical device 402, which can be a viewing scope or binocular of any time, includes an internal display 404. The text being streamed on internal display 404 indicates when the lighthouse was built. Another person with more information about the lighthouse can speak into their communications system (which can be coupled to a scope, as shown in FIG. 1A), and that speech can be streamed in textual form on other scopes, as is shown in FIG. 4A. A tour guide can discuss audibly the lighthouse construction information, which appears as text on an internal display 404 of the optical device 402. A tourist, therefore, can continue viewing the scene while also seeing text within the optical path that is provided by the tour guide.

FIG. 4B is a schematic diagram 410 of a scope 412 on a rifle being used for target practice. The spotter can use a spotting scope to help the marksman zero the rifle scope, the spotting scope being similar to primary scope assembly 101a discussed with FIG. 1A. The spotter can tell the marksman how to adjust the scope or where the marksman is missing the target. The spotter's instructions can be streamed as text on the internal display 414 of the rifle scope 412. The color, size, and font of the text can be selected by the operator (e.g., through menu options).

FIG. 4C is a schematic diagram 420 a scope 422 on a rifle for hunting. A spotter can use a spotting scope (similar to primary scope assembly 101a) and can inform the hunter of where a better target is located. For example, the spotter may have found a bigger animal to the left of where the hunter is looking. The instructions from the spotter can be streamed on an internal display 424 of the hunter's rifle scope as text and as graphics (here showing a left arrow in addition to text).

Embodiments of the present disclosure include an optical device, such as a spotting scope, binoculars, or other optical device. The optical device includes a microphone, a text and speech processor, and a communications system. The microphone can receive audible speech. The text and speech processor can convert the audible speech into text. The communications system can stream the text to other optical devices. The other optical devices can receive the streaming text and display streaming text onto internal displays.

What is claimed is:

1. An apparatus comprising:
an optical device comprising a digital display;
a communications system coupled to the optical device, wherein the communications system receives, from a device, a wireless signal comprising data representing a textual signal and one or more tones;
a hardware processor to convert the data representing the textual signal into a format for displaying on the digital display, wherein the data is converted into a graphic primitive to direct a user of the optical device to view an object that a user of the device is viewing, wherein the hardware processor decodes the one or more tones into a natural language message, and wherein the digital display displays the natural language message; and
converting, using a natural language message into audible speech for output by an audio input/output device.

2. The apparatus of claim 1, wherein the digital display is an internal display of the optical device.

3. The apparatus of claim 2, wherein the optical device comprises an optical path and wherein the digital display displays information in the optical path.

4. The apparatus of claim 1, wherein the communications system comprises an audio output to audibly output audible speech.

5. The apparatus of claim 1, further comprising a microphone to receive audible speech and to convert audible speech into electrical signals; and

wherein the communication system is to send the electrical signals to another communications system.

6. The apparatus of claim 1, further comprising a text and speech processor to convert signals representing audible speech into signals representing visual text and to convert signals representing visual text into signals representing audible speech.

7. A method comprising:

receiving, from a host device, a wireless signal at a communications system coupled to an optical device, the wireless signal comprising a data payload and one or more tones;

determining, from the data payload, textual information;

decoding, from the data payload, the one or more tones into a natural language message;

displaying the textual information and the natural language message on a display of the optical device, wherein the textual information is converted into a graphic primitive to direct a user of the optical device to view an object that a user of the host device is viewing;

converting, by a hardware processor executing speech-to-text conversion instructions, the natural language message into audible speech for output; and outputting the audible speech.

8. The method of claim 7, further comprising:

converting the textual information to audible speech by a text and speech processor at the optical device; and outputting the audible speech to an audio output of the optical device.

9. The method of claim 7, further comprising:

receiving audible speech into a microphone of the optical device;

converting the audible speech into digital data; and transmitting the digital data of the audible speech by the communications system to the host device.

10. The method of claim 7, further comprising:

receiving audible speech into a microphone of the optical device;

converting the audible speech into text by the hardware processor executing the speech-to-text conversion instructions;

encoding the text as digital data; and transmitting the digital data with the text to the host device by the communications system.

11. The method of claim 7, further comprising:

receiving an indication of an acknowledgement of the textual information from a tactile user interface, the indication being non-audible; and transmitting a wireless signal of the acknowledgement to the host device.

12. The method of claim 7, wherein the display of the optical device is an internal display of the optical device.

13. An apparatus comprising:

an optical device;

an audio input/output device to receive audible voice inputs;

a text and speech processing system to convert the audible voice inputs into textual data and to convert a natural language message into audible speech for output from the audio input/output device;

a communications system coupled to the optical device, wherein the communications system transmits a wireless signal comprising textual data to another device, wherein the textual data is converted into a graphic primitive on the another device to direct a user of the another device to view an object that a user of the optical device is viewing, and wherein the communications system receives a wireless signal comprising one or more tones from another device;

a processor to decode the one or more tones into the natural language message; and a display to display the natural language message.

14. The apparatus of claim 13, wherein:

the communications system is to receive a wireless signal comprising textual data from another device;

the text and speech processing system is to convert the textual data into audible speech; and the audio input/output device is to output the audible speech.

15. The apparatus of claim 13, wherein:

the apparatus comprises a digital display for displaying information;

the communications system is to receive a wireless signal comprising voice data from another device;

the text and speech processing system is to convert the voice data into textual message; and the display is to display the textual message.

16. The apparatus of claim 13, wherein:

the communications system is to receive a wireless signal comprising voice data from another device, the voice data comprising data representing audible speech; and the audio input/output device is to output audible speech.

* * * * *